(12) United States Patent
Gärtner et al.

(10) Patent No.: US 9,725,360 B2
(45) Date of Patent: Aug. 8, 2017

(54) METHOD FOR THE DRY SLAKING OF CALCIUM AND MAGNESIUM OXIDES FROM CALCOMAGNESIAN COMPOUNDS

(71) Applicant: S.A. Lhoist Recherche et Developpement, Ottignies-Louvian-la-neuve (BE)

(72) Inventors: Robert Sebastian Gärtner, Buizingen (BE); Marion Lorgouilloux, Strepy-Bracquegnies (BE)

(73) Assignee: S.A. Lhoist Recherche et Developpement, Ottignies-Louvain-la (BE)

( * ) Notice: Subject to any disclaimer, the term of this patent is extended or adjusted under 35 U.S.C. 154(b) by 43 days.

(21) Appl. No.: 14/766,478

(22) PCT Filed: Feb. 18, 2014

(86) PCT No.: PCT/EP2014/053053
§ 371 (c)(1),
(2) Date: Aug. 7, 2015

(87) PCT Pub. No.: WO2014/128092
PCT Pub. Date: Aug. 28, 2014

(65) Prior Publication Data
US 2015/0368154 A1  Dec. 24, 2015

(30) Foreign Application Priority Data
Feb. 19, 2013  (BE) .................................. 2013/0106

(51) Int. Cl.
| C04B 2/06 | (2006.01) |
| C01F 5/16 | (2006.01) |
| C01F 11/00 | (2006.01) |
| C01F 11/02 | (2006.01) |

(52) U.S. Cl.
CPC .................. C04B 2/06 (2013.01); C01F 5/16 (2013.01); C01F 11/00 (2013.01); C01F 11/02 (2013.01); *C01P 2006/12* (2013.01)

(58) Field of Classification Search
CPC ...... C01B 2/06; C01F 5/22; C01F 5/16; C01F 11/00; C01F 11/02
See application file for complete search history.

(56) References Cited

U.S. PATENT DOCUMENTS

| 2,408,647 A * | 10/1946 | Huntzicker | ............... C04B 2/02 106/800 |
| 2,833,626 A * | 5/1958 | Knibbs | ..................... C04B 2/04 422/162 |
| 2007/0036702 A1* | 2/2007 | Huege | ...................... C01F 7/74 423/117 |

FOREIGN PATENT DOCUMENTS

| JP | 01212214 A * | 8/1989 |
| WO | 2014/128092 A1 | 8/2014 |

\* cited by examiner

*Primary Examiner* — Melvin C Mayes
*Assistant Examiner* — Michael Forrest
(74) *Attorney, Agent, or Firm* — Whitaker Chalk Swindle & Schwartz PLLC; Charles D. Gunter, Jr.

(57) ABSTRACT

The invention relates to a method for the dry slaking of calcium oxides and magnesium from calcomagnesian compound containing preferably at least 10 wt. % of MgO in relation to the total weight of said calcomagnesian compound, in which calcomagnesian compound is supplied to a slaking vessel, a slaking aqueous phase is supplied to the slaking vessel, followed by slaking the calcomagnesian compound delivered to the slaking vessel, by means of the slaking aqueous phase, and forming hydrated solid particles of calcium hydroxides and magnesium, in the presence of an additive. The invention also relates to the compound produced in this way.

20 Claims, 4 Drawing Sheets

METHOD FOR THE DRY SLAKING OF CALCIUM AND MAGNESIUM OXIDES FROM CALCOMAGNESIAN COMPOUNDS

BACKGROUND OF THE INVENTION

1. Field of the Invention

This invention relates to a method for the dry slaking of calcium and magnesium oxides from calco-magnesian compounds preferably containing at least 10% by weight of MgO relative to the total weight of said calco-magnesian compound, comprising the steps of:

feeding calco-magnesian compound containing MgO into slaking equipment;

feeding an aqueous slaking phase into said slaking equipment; and slaking the said calcium and magnesium oxides of the said calco-magnesian compound fed into the said slaking equipment, with said aqueous slaking phase, leading to the formation of slaked solid particles of calcium and magnesium hydroxides (e.g. of general formula $xCa(OH)_2.yMg(OH)_2$).

2. Description of the Prior Art

Typically, the slaking of MgO to form magnesium hydroxide $Mg(OH)_2$, compared with conventional slaking of CaO to form $Ca(OH)_2$, is a difficult reaction to carry out profitably at industrial level. One of the possible routes to produce fully hydrated products, namely in which the MgO and CaO are fully converted to $Mg(OH)_2$ and $Ca(OH)_2$ respectively, is high pressure hydration during which a supply of heat is sometimes necessary as a function of the reactivity of the MgO. In some cases during wet process slaking, very long reaction times may overcome these drawbacks. However, the use of high pressure hydrators with or without the supply of heat, or long residence times are as many obstacles which reduce the industrial production of magnesium hydroxide from MgO, preference being given to the chemical production of $Mg(OH)_2$ from salts treated with caustic solutions.

Just as there exist limestone deposits (calcium carbonate of formula $CaCO_3$), there also exist dolomite deposits (mixed calcium and magnesium carbonate of general formula $xCaCO_3.yMgCO_3$ where x and y are molar coefficients such that $x/y=0.8$ to 1.2), and deposits of other mixed carbonates of general formula $xCaCO_3.yMgCO_3$ where $1.2 \leq x/y \leq 25$) or of any other mixed carbonate of calcium and magnesium. In the same manner as for limestones, dolomites or the other aforementioned mixed carbonates can be calcined thereby producing dolomitic quicklime of formula $xCaO.yMgO$ or any other mixed calcium and magnesium oxide. Similar to quicklime, a hydration reaction is initiated when dolomitic quicklime or any other aforementioned mixed oxide is contacted with water. However, as mentioned above, it is known that magnesium oxide has much lower reactivity to water than high calcium quicklime that is highly hydrophilic, the hydration of these calcined compounds thereby becoming much more complex than the hydration of high calcium quicklime.

For this reason, in a large majority of cases, a hydrated dolime, or other mixed calcium and magnesium hydroxide produced industrially by dry process is in fact a semi-hydrated dolime or other aforementioned mixed hydroxide containing a non-negligible amount of residual non-hydrated MgO. The above-mentioned semi hydrated dolime is generally represented by the formulas $xCa(OH)_2.yMgO$ or $xCa(OH)_2.(y-z)Mg(OH)_2.zMgO$ depending on the hydration level of the magnesium oxide (where $x/y=0.8$ to 1.2). The other aforementioned mixed hydroxides have formulas of same type but with different calcium/magnesium molar ratios.

To overcome this low reactivity to water of quick dolime or other aforementioned calcined compound, with a view to obtaining fully hydrated products (of general formula $xCa(OH)_2.yMg(OH)_2$) it is known to have recourse to a much greater amount of water than the amount of water used for dry slaking and/or higher temperatures than those prevailing in standard hydration reactions for quicklime, or milling of the dolime or other aforementioned calcined compound prior to hydration, even to a hydrothermal reaction i.e. hydration under pressure at high temperature (under water vapour, 7-13 bars, 115-165° C.) (Boynton, Chemistry and Technology of Lime & Limestone, $2^{nd}$ edition, Wiley Interscience, pp. 325-326 and pp 374). A dolomitic product of this type that is fully hydrated is known as Type S as opposed to Type N which represents normal dolomitic hydrates i.e. partly hydrated (OATES, J.A.H. Lime and Limestone, Weinheim: Wiley-VCH, 1998, pp. 222-223).

In all cases these slaking processes are complex and costly and reduce the industrial use of these MgO-containing compounds.

FR2669327 A1 teaches the use of chemical agents such as amines or glycols to produce a hydrated lime at regulated or controlled temperature having improved plastic properties and high specific surface areas.

WO9209528 also concerns the use of additives selected from among glycols and/or amines to produce calcium and/or magnesium hydroxides having high specific surface areas.

U.S. Pat. No. 3,120,444 discloses the addition of low molecular weight aliphatic alcohols to obtain hydrated lime with improved plastic properties.

U.S. Pat. No. 1,856,763 discloses a method to produce quicklime of high purity with delayed reactivity for use thereof in mortars.

SUMMARY OF THE INVENTION

It is the objective of the invention to overcome the shortcomings of the prior art by providing a method allowing the simple, low-cost production of a compound via dry process that can be implemented at industrial level, the compound containing slaked solid particles of $Mg(OH)_2$ whereby hydration is accelerated and/or whereby the rate of conversion of magnesium oxide MgO to the hydroxide $Mg(OH)_2$ is increased. To solve this problem, there is provided according to the invention a method as already mentioned hereabove wherein the said slaking is performed in the presence of an additive selected from the group formed by water-soluble metal hydroxides, in particular alkaline hydroxides (particularly Na, Li or K hydroxides and more particularly NaOH), water-soluble metal silicates in particular water-soluble alkaline or alkaline-earth silicates (particularly the alkaline silicates of Na, Li or K, and more particularly Na silicates), water-soluble aluminates, water-soluble metal halides, in particular chlorides, bromides or fluorides (particularly metal chlorides), water-soluble metal nitrates, water-soluble ammonium salts, ammonia and the mixtures thereof.

In the meaning of the present invention, by the terms <<water-soluble>> is meant that the additives are at least partly water-soluble. The solubility rate of the additives must not necessarily be high, the additives being able to become solubilised during the slaking reaction.

The additives selected from the above said group have the advantage of allowing accelerated and/or improved hydration at ambient pressure of the MgO-containing compound with relatively short reaction times. Therefore the slaking reaction in the presence of the said additives becomes industrially applicable and hence allows the production of compounds comprising slaked solid particles in simple and low-cost manner.

Advantageously the said calcium and magnesium oxides of the calco-magnesian compound have a magnesium oxide content of less than 50% by weight relative to the weight of the said calco-magnesian compound, and preferably have a calcium/magnesium molar ratio of between 0.8 and 1.2.

More particularly the said calco-magnesian compound is selected from the group formed by dolime, semi-calcined dolomite or semi-hydrated dolime, mixed calco-magnesian compounds, in particular mixed calcium and magnesium oxides having a substantial MgO content namely higher than 10% by weight relative to the total weight of the mixed oxide, and the mixtures thereof.

The hydration of dolime and of all materials having a high proportion of MgO (namely at least 10% by weight relative to the total weight of the calco-magnesian compound, or in some embodiments relative to the total weight of mixed oxide) is incomplete in conventional industrial processes and requires either less burned materials (soft burned dolime) to obtain acceptable conversion rates or long reaction times not well suited to an industrial process.

This low reactivity of the MgO portion is routinely accounted for by the presence of overburned products due to the sensitivity of magnesium oxide during the calcination operation. For dolomitic products this over-burning is typically the result of a need to apply temperatures allowing also at least the partial conversion of calcium carbonate ($CaCO_3$) to calcium oxide (quicklime).

It follows thereupon, that in the industrial exercise of hydration of dolime, dolomitic lime or magnesian lime, but also of any similar product containing substantial amounts of MgO, depending on the loss of reactivity caused by over-burning, lower conversion rates to $Mg(OH)_2$ are obtained when slaking by dry process.

Alternatively, the application of extreme slaking conditions may be required to obtain a more hydrated product such as the application of high pressures, reaction times longer than 24 hours or water vapour hydration in relation to the degrees of over-burning for products of mineral origin.

It is indeed a well-known fact (see Boynton pp. 374-376) that the dolomites which can be mostly hydrated by dry process at atmospheric pressure, irrespective of hydration time, are rather rare. In such cases the slaking reaction is performed in a silo with excess water for times in the order of 10 to more than 24 hours, which jeopardises the industrial profitability of such slaking reactions. Typically, most hydrated dolimes have a low $Mg(OH)_2$ content and in general only 10 to 25% of the MgO is hydrated, sometimes less than 10%, or even less than 5% is hydrated. This is particularly true for dry hydration; wet hydration being able to obtain greater MgO hydration rates. Even after retention in a silo for prohibitively long residence times the conversion is rarely or even never complete. Boynton discloses in this respect that to obtain higher conversion rates, hydration under pressure must be applied.

These hydrated products therefore typically contain significant amounts of non-reacted MgO. This MgO may react subsequently for example during transport, during use or even in derivative products prepared from these hydrated products typically creating numerous problems starting with expansion of the product during later hydration.

In the method of the invention, the presence of the additive allows a significant increase in conversion rates with relatively short reaction times compared with conventional slaking processes for low-reactivity compounds, at ambient pressure and within acceptable temperature ranges for industrial application.

Advantageously the said alkaline hydroxides are selected from the group formed by sodium hydroxide, potassium hydroxide, lithium hydroxide and the mixtures thereof. Preferably the alkaline hydroxide is sodium hydroxide.

Advantageously the said water-soluble alkaline or alkaline-earth silicates are selected from the group formed by calcium silicate, magnesium silicate, sodium silicate, potassium silicate, lithium silicate. Preferably the silicate is an alkaline silicate, advantageously a sodium silicate.

Advantageously the said water-soluble aluminates are selected from the group formed by potassium aluminate, sodium aluminate, lithium aluminate, ammonium aluminate and the mixtures thereof.

Advantageously the said water-soluble metal halides are selected from the group formed by metal chlorides, metal bromides and metal fluorides. Preferably, the halide is a chloride.

Preferably the said metal nitrates and halides comprise at least one atom of a metal selected from the group formed by aluminium, calcium and magnesium, more preferably aluminium and magnesium.

In a first particular embodiment of the method of the invention, the said additive is added to the said aqueous slaking phase before the feeding of the said aqueous slaking phase to form an additive-containing aqueous slaking phase.

In one variant of the method of the present invention, the said additive is added to the said aqueous slaking phase inside the said slaking equipment or in the said feed of the said aqueous slaking phase.

In a further variant of the method of the invention, the said additive is added to the said MgO-containing calco-magnesian compound or in the said feed of the said calco-magnesian compound.

In one preferred embodiment of the method of the present invention, the said additive is supplied at a content of between 0.1 and 20%, preferably between 1 and 10% by weight relative to the total weight of MgO.

In the particular case of dolimes ($xCaO.yMgO$), these are usually characterized by their chemical purity and reactivity.

By high purity is meant a low percentage of impurities i.e. in general less than 5%, advantageously less than 4% by weight and preferably less than 3% even less than 2% by weight of the conventional impurities initially contained in the dolomite ($SiO_2$, $Al_2O_3$, $Fe_2O_3$, $SO_3$ ...), but also a high content of CaO+MgO oxides. This also assumes limitation of all the other possible forms of calcium and magnesium such as unburnt materials ($CaCO_3$, $MgCO_3$) or compounds of calcium and/or magnesium silicate or aluminate type. The dolimes used in the method of the invention contain more than 90% by weight, advantageously more than 93%, preferably more than 96% by weight and further preferably more than 97% by weight of $CaCO_3$, CaO, $Ca(OH)_2$, $Mg(OH)_2$ and MgO and optionally residues of $MgCO_3$; CaO and MgO preferably being in majority.

For the method subject of the present invention to be efficient, i.e. in order that the additives play a significant role on the level of hydration of the MgO contained in the calco-magnesian products, the initial calco-magnesian product before hydration according to the method of the invention must have a minimum reactivity.

Should the calco-magnesian products to be hydrated be very scarcely reactive, due for example to major over-burning of the starting mineral, such as dolomite in particular (particular case of sintered dolomite), the hydration of the MgO contained in these calco-magnesian compounds is most difficult and the additives claimed in the present invention, while they may improve the hydration percentage of MgO, will certainly not be able to increase it by 30%, preferably by 100%, more preferably by 150% and further preferably by 200%.

To describe the calco-magnesian compounds that can be used in the method of the invention, a very simple test has been developed and is described below. In the remainder hereof, it will be designated as a "simplified conversion rate determination test" which measures the degree of reactivity of the calco-magnesian compounds to be hydrated.

For this test, four liters of demineralised water previously heated to 70° C. are placed in a graduated, cylindrical glass reactor with double jacket having an effective capacity of 5 dm³ and inner diameter of about 15 cm. The reactor is open at the top allowing a mixer paddle connected to a motor and a thermocouple to be placed in the water. The water is stirred at 500-600 rpm. Water at 73° C. is caused to circulate in the double jacket using a thermostatic circulating bath.

When thermal equilibrium is reached i.e. when the temperature of the water in the reactor stabilises at 70° C.±° C., 200 g of calco-magnesian product are added at once to the water under stirring. Stirring is maintained for 30 minutes during which the temperature of the reaction medium must remain between 70° C. and 80° C. With scarcely reactive products this temperature will remain close to 70° C. With more reactive products in particular those containing CaO, the temperature will be closer to 75 even 80° C. After the reaction time of 30 minutes stirring is stopped and the suspension filtered through a Büchner. A sample of 30 g of solid product collected by filtration is dried at 150° C. in less than 30 minutes using an infrared thermobalance.

Once dried, the product is subjected to thermogravimetric analysis and the conversion rate of MgO is calculated using the method described below.

Advantageously the calco-magnesian products which, according to this simplified conversion rate determination test, exhibit an MgO conversion rate of at least 10%, preferably higher than 15% and more preferably higher than 20%, can be used in the method of the invention in the presence of at least one additive.

In the particular case of dolimes of formula xCaO.yMgO where x/y is between 0.8 and 1.2, another test can be used to characterize dolimes reactivity called "reactivity test" in the remainder hereof. For this test described in standard ASTM C110 under the heading "slaking rate", 400 g of distilled water previously heated to 40° C. are placed in an isothermal reactor. This water is placed under stirring with mixer paddles rotating at 400±50 rpm after which 120 g of dolime are added at once to the water. The change in temperature of the suspension thus prepared is recorded as a function of time up until a constant temperature is reached. Initially, before the dolime is added to the water, the temperature is 40° C. and after the addition of the dolime to the water the hydration reaction is triggered and is accompanied by a rise in temperature due to hydration of the CaO portion of the dolime firstly and followed secondly by hydration of the MgO part.

This reactivity test is routinely applied to dolimes and dolime reactivity is usually characterized by its $t_{70}$ value which represents the time needed to reach 70° C. from 40° C. under the normalised conditions of this test. In the present invention another criterion is considered, $t_{60}$, which similarly represents the time needed to reach 60° C. from 40° C. under the normalised conditions of this reactivity test. Advantageously, the dolimes of the present invention have a $t_{60}$ value of 5 min or less.

The calco-magnesian products described in the present invention are generally characterized after and/or before their hydration in accordance with the method of the present invention using a thermal analysis method and more particularly thermogravimetry. This measurement is performed by placing 50 mg to 2 g of the hydrated sample in a furnace equipped with a balance.

The weight of the sample is recorded during a temperature rise from ambient temperature up to a value of between 900 and 1000° C. at the rate of 5 to 20° C./min under a stream of air or nitrogen. The sample is dried at 150° C. prior to this thermogravimetric measurement. This method allows the quantitation of different compounds contained in the analysed sample, and in particular $Mg(OH)_2$, $Ca(OH)_2$ and $CaCO_3$. The non-hydrated or non-carbonated phases (e.g. CaO and MgO) cannot be identified and quantitated using this thermogravimetric method.

Before their hydration in accordance with the method subject of the present invention, the calco-magnesian products may contain $Ca(OH)_2$ possibly being i) calcium hydroxide which may have been formed by reaction of CaO with humidity in the air during storage or transport steps for example (if the calco-magnesian products contain calcium in CaO form) or ii) Ca hydroxide which may have formed during a preceding hydration step of the calco-magnesian compound using a method different from the method subject of the present invention and not using an additive. The $Ca(OH)_2$ content of the calco-magnesian products before hydration in accordance with the method of the invention is between 1 and 65%, the top value corresponding to the particular case of semi-hydrated dolomite of general formula $Ca(OH)_2.MgO$ (i.e. about 65% $Ca(OH)_2$ and 35% MgO when impurities are neglected).

Since MgO is less sensitive to humidity than CaO, the calco-magnesian products before hydration in accordance with the method of the present invention generally contain less than 1.0%, preferably less than 0.5% and in particular less than 0.2% $Mg(OH)_2$.

In some cases, the calco-magnesian products may contain $CaCO_3$ possibly being i) residual calcium carbonate derived from the original mineral (e.g. dolomite) which has not decomposed during the calcination step of the mineral or ii) calcium carbonate which may have formed by reaction of $Ca(OH)_2$ with ambient $CO_2$ during storage and transport steps for example. The $CaCO_3$ content of the calco-magnesian products before hydration may be between 1 and 72%, the top value corresponding to the particular case of half-burnt dolomite of general formula $MgO.CaCO_3$ (i.e. about 29% MgO and 71% $CaCO_3$ when impurities are neglected).

After hydration according to the method of the present invention, the calco-magnesian products may again contain $CaCO_3$ since this compound is insensitive to hydration. They also contain $Ca(OH)_2$ either already initially contained in the calco-magnesian product (e.g. semi-hydrated dolomite) or resulting from hydration of CaO (if the calco-magnesian compound before hydration contains CaO). They also contain $Mg(OH)_2$ formed by hydration of the MgO contained in the calco-magnesian product before hydration.

Regarding calco-magnesian products containing $Mg(OH)_2$, the proportion of $Mg(OH)_2$ can be quantified by thermogravimetry by considering the weight loss between 200 and 450° C., in particular between 220 and 420° C., more particularly between 250 and 400° C., which corresponds to water release due to dehydroxylation of $Mg(OH)_2$ ($Mg(OH)_2$ decomposes into $MgO+H_2O$).

Regarding calco-magnesian products containing $Ca(OH)_2$, the proportion of $Ca(OH)_2$ can be quantified by thermogravimetry by considering the weight loss between 400 and 600° C., in particular between 420 and 580° C. and more particularly between 450 and 560° C., which corresponds to water release due to dehydroxylation of $Ca(OH)_2$ ($Ca(OH)_2$ decomposes into $CaO+H_2O$).

With respect to calco-magnesian products containing $CaCO_3$, the proportion of $CaCO_3$ can be quantified by thermogravimetry by considering the weight loss between 600 and 900° C., in particular between 620 and 850° C. and more particularly between 650 and 800° C., which corresponds to release of $CO_2$ due to decarbonatation of $CaCO_3$; ($CaCO_3$ decomposes into $CaO+CO_2$).

In the meaning of the present invention, by <<MgO conversion>> (denoted $tc_{MgO}$ (%)), is meant the ratio between the number of moles of magnesium in the $Mg(OH)_2$ fraction of the final hydrated product and the number of moles of magnesium in the MgO initially contained in the calco-magnesian product before hydration. It can be calculated using formula 1 below:

$$tc_{M_gO}(\%) = \frac{\% \text{ Mg(OH)}_{2 \text{ final}} \times M_{MgO}}{M_{Mg(OH)2} \times \% \text{ MgO}_{initial} \times \left(1 - \frac{e_1 + e_2}{100}\right)} \times 100\% \quad \text{Formula 1}$$

% $Mg(OH)_{2final}$ represents the weight proportion of $Mg(OH)_2$ in the hydrated product such as determined after weight loss corresponding to decomposition of $Mg(OH)_2$ on the thermogravimetric curve;

% $MgO_{initial}$ is the weight proportion of MgO in the product to be hydrated, determined by X-ray fluorescence;

$M_{MgO}$ is the molar mass of MgO (g/mol) (40.3 g/mol);

$M_{Mg(OH)2}$ is the molar mass of $Mg(OH)_2$ (g/mol) (58.3 g/mol);

e1 is the water attached to $Mg(OH)_2$ in the hydrated product and therefore corresponds to the absolute value of the first weight loss on the thermogravimetric curve;

e2 is the water attached to $Ca(OH)_2$ in the hydrated product and therefore corresponds to the absolute value of the second weight loss on the thermogravimetric curve.

Advantageously, according to the present invention, the conversion rate of MgO to $Mg(OH)_2$ is improved by 30%, preferably by 100%, more preferably by 150% and further preferably by 200% compared with the conversion rate obtained in the absence of additive under the same operating conditions.

The improved conversion rate is calculated in the form of an increase in conversion rate according to $((t_2-t_1)/t_1) \times 100$ where $t_1$ is the conversion rate of MgO to $Mg(OH)_2$ obtained in the absence of additive and $t_2$ is the conversion rate of MgO to $Mg(OH)_2$ obtained in the presence of additive.

This conversion rate is also preferably obtained with reaction times of less than 5 hours, preferably less than 2 hours and more preferably less than 1 hour, in particular in less than 30 minutes and still further particularly in less than 20 minutes, the shortest times being applied for continuous processes; in some cases, a reaction time of 15 minutes, even 10 minutes or less will be sufficient.

The effective reaction time may be longer than the residence time in the hydrator. By <<reaction time>> in the meaning of the present invention is meant the time elapsed since the contacting of the said calco-magnesian product with the said aqueous phase until the aforementioned conversion rate is obtained. This time includes the residence time of the product in the reactor used to perform hydration and may also include an additional time corresponding for example to storage of the product in a silo or in containers (big bags, drums, . . . ) after the hydration phase properly so-called which takes place in the reactor. If, after the hydration phase, the product still contains non-hydrated oxides (CaO and MgO) and free water (moisture), it may continue to become hydrated during steps downstream of hydration (separation, milling, silo storage . . . ). It is observed that with the additives of the invention the additional slaking occurring after the residence time in the hydrator is also accelerated compared with a situation without additive.

The preferred hydration equipment for implementing the method of the invention is conventional dry process hydration equipment, which may be either a single-stage hydrator i.e. formed of a single horizontal (semi-)cylindrical reactor equipped with a central shaft and paddles, this reactor possibly being preceded by another horizontal cylinder used as pre-mixer, or a multi-stage hydrator composed of 3 successive reactors for example of increasing diameter into which the product falls as the hydration reaction progresses, or in general any other equipment able to be used for dry hydration of quicklime.

In one preferred embodiment of the method of the present invention, the said calco-magnesian compound is a powder compound. The hydrator is then fed with compound containing powder MgO having a particle size of between 20 µm and 10 mm, preferably <5 mm, more preferably <2 mm.

Preferably, the said slaked solid particles of calcium and magnesium hydroxides are in the form of solid particles containing less than 30% water by weight. The weight ratio between water and the calco-magnesian compound containing MgO is less than 1.5 if the slaking method is performed via dry process.

In one particular embodiment of the method of the present invention, in particular in the presence of additives of alkaline hydroxide type, the products derived from the hydration method of the present invention have small specific surface areas, advantageously of between 5 and 15 $m^2/g$, preferably smaller than 12 $m^2/g$ and more preferably smaller than 10 $m^2/g$.

In the meaning of the present invention by the term <<dry>> slaking is meant a dry process in the strictest sense or a nearly-dry process.

In one <<dry>> slaking mode the amount of water added is limited to the amount required for the slaking reaction increased by the amount lost in water vapour on account of the exothermal nature of the reaction. As soon as the product obtained leaves the hydrator it is a powder and generally comprises less than 2% residual non-hydrated CaO and less than 2% humidity with maximum humidity of 5%. It is to be noted that the residual humidity of this hydrate will be at least 0.3%, in general 0.5% or higher, often 1% or higher. Also, the residual humidity may be temporarily higher than 5% when leaving the hydrator, in particular when the reaction time is extended beyond the residence time in the hydrator. Values on leaving the hydrator of up to 10% or more (with less than 15%) can be observed at the output of the hydrator. The product can be packaged and marketed directly after optional step of particle size control, but without requiring any prior drying and de-agglomeration step. The water/calco-magnesian product weight ratio allowing this low humidity level to be reached is highly dependent on the reactivity of the said calco-magnesian compound. In the particular case of dolomites of formula xCaO.yMgO with x/y between 0.8 and 1.2, the water/dolime weight ratios allowing the manufacture of products containing less than 5% humidity are generally between 0.2 and 0.6 depending on the reactivity of the dolime. Usually for the said dolimes, this ratio is between 0.3 and 0.5.

In one variant of the preceding slaking mode, hydration can be carried out with greater excess of water in accordance with WO 97/14650. In this case, the hydrate obtained has humidity of between 5 and 30% by weight, more often between 15% and 30% by weight, in particular between 20 and 30% by weight. In some cases, this humidity does not exceed 25% by weight. On account of this humidity, the hydroxides generally require a drying and de-agglomeration step before storage and transport. This slaking mode will be called <<nearly-dry>> slaking. For the dolomites such as described in the above paragraph it corresponds to water/dolime weight ratios of generally between 0.6 and 1.2, in particular between 0.7 and 1.0 depending on the reactivity of the dolime.

In general, the lower the reactivity of the dolime the lower the temperature during its hydration. This leads to lesser evaporation of the water added for the hydration reaction and hence to a greater amount of liquid water and as result higher humidity in the hydrated product. For scarcely reactive dolimes the amount of water added for the hydration reaction is limited by the humidity of the product leaving the hydrator. For humidity levels higher than 25% and even close to 30% the product more resembles a paste than a powder. Such humidity levels raise problems for hydrators which are not adapted for the working of pastes. Therefore the amount of water added for the hydration of a scarcely reactive dolime is limited to remain with an acceptable humidity range. Yet by limiting the amount of added water the efficacy of the hydration reaction is also limited. It is known that the greater the amount of water the better the promoting of MgO hydration.

Advantageously, the method of the present invention further comprises a de-agglomeration or milling step of the said slaked solid particles of Ca(OH)2 and Mg(OH)2.

Typically, in one preferred embodiment of the method of the invention, the said aqueous slaking phase has a temperature before slaking lower than 90° C.

Other embodiments of the method of the invention are given in the appended claims.

The present invention also relates to a calco-magnesian compound of formula $xCa(OH)_2 \cdot aMgO \cdot bMg(OH)_2 \cdot I$ where x, a and b are molar coefficients such that a+b=y, x/(a+b)=x/y is between 0.8 and 1.2, where b corresponds to a weight proportion of $Mg(OH)_2$ between 5 and 50%, and I represents impurities, the said calco-magnesian compound having a specific surface area measured by nitrogen adsorption manometry and calculated using the BET method of 5 m²/g or higher and 15 m²/g or lower.

This calco-magnesian compound is in particular an hydrated dolime, which, in addition of having a high $Mg(OH)_2$ content and low BET specific surface area, is obtained by dry hydration following the method of the invention.

In one advantageous embodiment, the calco-magnesian compound of the invention is dolime, in particular hydrated or partly hydrated dolime.

Preferably in the calco-magnesian compound of the present invention the molar coefficient b corresponds to a weight proportion of $Mg(OH)_2$ higher than 7%, preferably higher than 10%, advantageously higher than 15%, more advantageously higher than 20% and further advantageously higher than 30%.

Advantageously, in the compound of the invention the molar coefficient b corresponds to a weight proportion of $Mg(OH)_2$ lower than 45%, even lower than 40%.

In a further advantageous embodiment of the present invention, the calco-magnesian compound preferably obtained by dry hydration of dolomite has a said specific surface area measured by nitrogen adsorption manometry and calculated using the BET method of 12 m²/g or lower, in particular 10 m²/g or lower.

Other embodiments of the compound of the invention are given in the appended claims.

Other characteristics, details and advantages of the invention will become apparent from the description below that is non-limiting and given with reference to the appended Examples and Figures.

DETAILED DESCRIPTION OF THE INVENTION

The method of the invention therefore applies dry or nearly-dry hydration that is controllable, rapid and simple of dolime, dolomitic quicklime and magnesian lime inter alia or of any compound containing at least 10 weight % MgO which, in standard hydration equipment and through the use of an additive in preferred proportions of 0.1 to 20% preferably 1 to 10% and particularly advantageously 2 to 5 weight % relative to the total weight of MgO, allows a conversion rate of MgO to $Mg(OH)_2$ to be obtained that is significantly higher than that obtained under the same conditions but without an additive.

The additives of the present invention are selected from the group formed by water-soluble metal hydroxides, in particular alkaline hydroxides (Na, Li or K hydroxides and particularly NaOH), water-soluble metal silicates in particular water-soluble alkaline or alkaline-earth silicates (particularly the alkaline silicates of Na, Li or K, and more particularly Na silicates), water-soluble aluminates, water-soluble metal halides in particular chlorides, bromides or fluorides, (particularly metal chlorides), water-soluble metal nitrates, water-soluble ammonium salts, ammonia and the mixtures thereof.

Example 1

Figure 1:
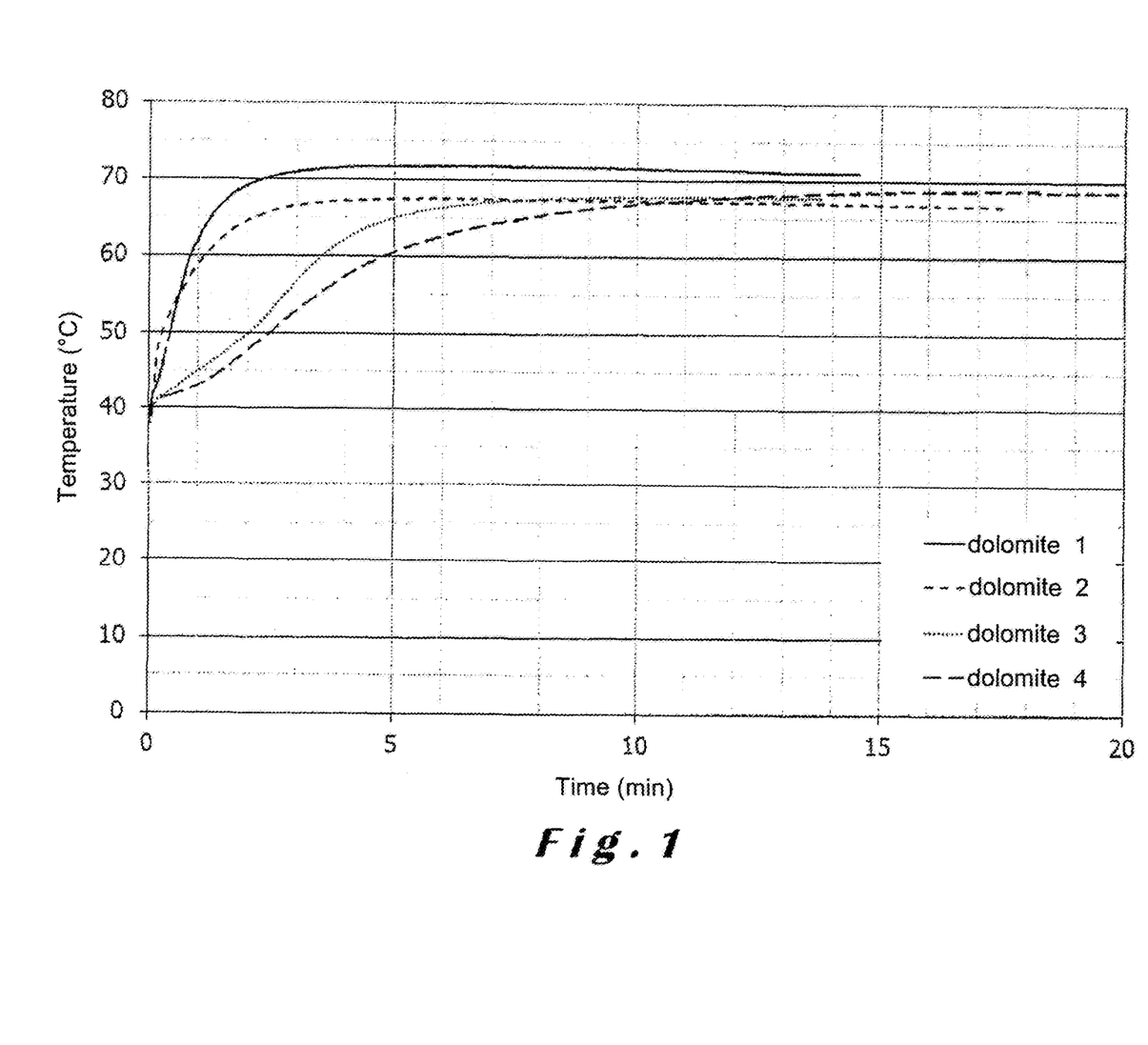
FIG. 1 illustrates the reactivity curves of the dolimes from Example 1.

In this example, 4 different dolimes were considered. These dolomites had different reactivities such as illustrated in FIG. 1 showing the temperature curves recorded during the reactivity test according to ASTM C110 of these dolomites. Under the conditions of this test all these dolomites reached 60° C. starting from 40° C. in less than 5 minutes.

Without considering impurities (e.g. traces of $CaCO_3$) dolime 1, according to thermogravimetric and X-ray fluorescence analyses, had a weight percentage of MgO of 39.5 weight %, a weight percentage of CaO of 51.9 weight % and a ratio x/y(mol) i.e. Ca/Mg of 0.94. Dolime 2, according to thermogravimetric and X-ray fluorescence analyses, had a weight percentage of MgO of 36.8 weight %, a weight percentage of CaO of 47.9 and ratio x/y(mol) i.e. Ca/Mg of 0.93. Dolime 3, according to thermogravimetric and X-ray fluorescence analyses, had a weight percentage of MgO of 37 weight %, a weight percentage of CaO of 56.9 and a ratio x/y(mol) i.e. Ca/Mg of 1.11. Dolime 4, according to thermogravimetric and X-ray fluorescence analyses, had a weight percentage of MgO of 40.8 weight %, a weight percentage of CaO of 58.0 and ratio x/y(mol) i.e. Ca/Mg of 1.02.

These dolimes were all hydrated in a Lödige ploughshare mixer of 5 dm³ capacity acting as hydrator. For this hydration 1 kg, of dolime was gradually added to the mixer under rotation using a laboratory powder-metering feeder. Simultaneously water (demineralised water) was added to the mixer using a peristaltic pump connected to a spray nozzle. Since the dolimes did not all have the same particle size and were more or less fluid, the powder-metering feeder could not be used with the same settings for all the dolomites. Therefore the time needed to add the entirety of the kilogram of dolomite was of greater or shorter length for the different tested dolomites. However, for each setting of the dolomite metering feeder the water pump was also adjusted so that at all times the entirety of the dolime and the entirety of the water were added simultaneously during one same addition time, the time varying between 10 and 20 minutes according to dolomite. The water/dolime weight ratio for all the dolomites was set at a value of 0.4.

After this feeding phase into the mixer, mixing was continued for 1 h after which the product was removed from the hydrator, dried at 150° C. and analysed by thermogravimetry to determine the conversion rate of the MgO part of each dolime under these hydration conditions. Since the samples were analysed as soon as hydration was completed in the mixer, the reaction time in this case was comparable to the residence time of the product in the mixer i.e. 1 h (about 1 h 20 including the addition time of the dolomite and water to the hydrator).

For each of the 4 dolimes considered, hydration was initially conducted without additive and then with the addition of 3% sodium hydroxide (NaOH) relative to the weight of dolime. When the additive was NaOH this additive was placed in the hydration water at least 1 hour before the start of dolime hydration so as to guarantee complete dissolution of NaOH in the water and allow the NaOH solution thus prepared to return to ambient temperature.

All the results are given in Table 1 and indicate a significant positive effect during the hydration reaction of the use of NaOH on the extent of hydration of the MgO part of these dolomites. The use of NaOH allows an increase in MgO conversion rates by 200% up to over 630% compared with the conversion rate without additive, and this effect is most significant and visible after a hydration time of only 1 h.

water to the mixer instead of 1 hour as in Example 1. At the end of these 30 minutes (t=30 minutes) the product was removed from the mixer, a first sample was taken and the remainder of the product was placed in a closed plastic bucket. Other samples were then taken from this bucket at t=60, 90, 200 and 500 minutes i.e. a total of 5 samples at each time. In this example the reaction time therefore corresponds to the residence time (30 minutes) to which is added a storage time in the bucket.

The dolomite was hydrated without additive and then with 3% NaOH as in Example 1, and thereafter with KOH and LiOH. For KOH and LiOH the weights of KOH and LiOH were calculated so as to add to the mixer in which hydration took place the same number of moles of OH as the amount added with 3% NaOH. In the particular case of LiOH the

TABLE 1

| | Humidity* | final % Mg(OH)$_2$ | initial % MgO | $e_1$ (%) | $e_2$ (%) | tC$_{MgO}$ (%) | increase tC$_{MgO}$ (%) |
|---|---|---|---|---|---|---|---|
| Dolomite 1 no additive | 10.5 | 6.0 | 39.5 | 1.8 | 13.1 | 12.3 | — |
| Dolomite 1 + 3% NaOH | 7.5 | 17.0 | | 5.2 | 13.2 | 36.5 | 197 |
| Dolomite 2 no additive | 14.0 | 5.6 | 36.8 | 1.7 | 11.4 | 12.0 | — |
| Dolomite 2 + 3% NaOH | 10.4 | 19.3 | | 5.9 | 11.0 | 43.6 | 263 |
| Dolomite 3 no additive | 11.9 | 5.4 | 37.0 | 1.7 | 13.7 | 11.9 | — |
| Dolomite 3 + 3% NaOH | 8.2 | 18.3 | | 5.7 | 12.7 | 41.9 | 252 |
| Dolomite 4 no additive | 10.2 | 2.5 | 40.8 | 0.8 | 13.5 | 4.9 | — |
| Dolomite 4 + 3% NaOH | 5.7 | 17.3 | | 5.3 | 12.9 | 35.8 | 631 |

*Humidity of the product leaving the mixer after hydration time of 1 h, determined by measuring weight loss of the sample on drying at 150° C.

Example 2

Figure 2:
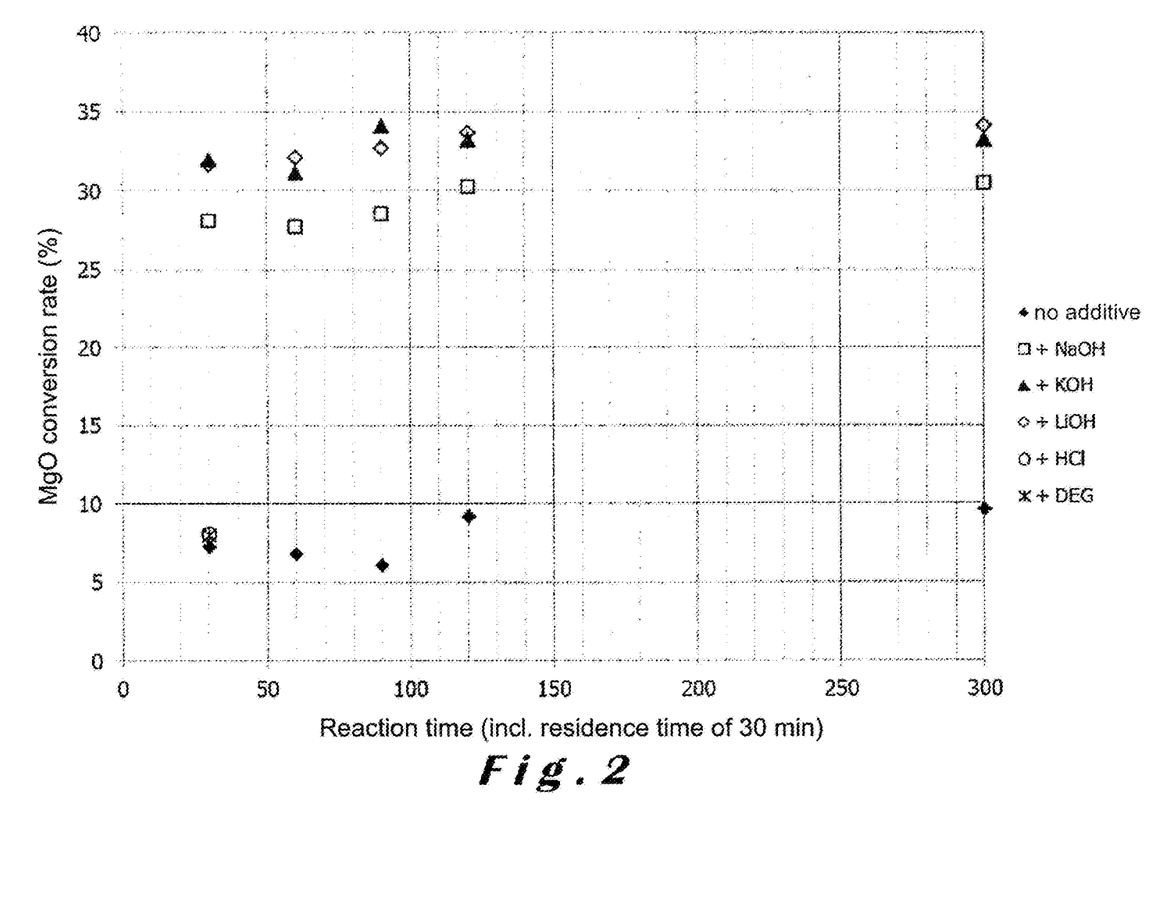
FIG. 2 illustrates the effect of additives on hydration of the MgO part of the dolimes from Example 2.

In this example only one dolime was considered. This was dolomite 1 already used in Example 1. This dolomite was hydrated following the same operating mode as described in Example 1 also keeping to a water/dolime weight ratio of 0.4. On the other hand, hydration was conducted this time for only 30 minutes after the addition time of the dolime and additive used was hydrated (LiOH.H$_2$O). These additives were added to the hydration water following the same procedure as described in. Example 1. All the results are grouped together in Table 2. These values clearly show the positive effect of the different additives tested on the hydration level of the MgO part of the dolime under consideration, and this effect was visible as early as after 30 minutes i.e. as soon as the product was removed from the hydrator (FIG. 2).

TABLE 2

| | Time (min) | Humidity$^a$ | final % Mg(OH)$_2$ | initial % MgO | $e_1$ (%) | $e_2$ (%) | tC$_{MgO}$ (%) | increase tC$_{MgO}$ (%)$^b$ |
|---|---|---|---|---|---|---|---|---|
| No additive | 30 | 11.5 | 3.6 | 39.5 | 1.1 | 13.2 | 7.4 | — |
| | 60 | 11.5 | 3.3 | | 1.0 | 13.3 | 6.7 | — |
| | 90 | 11.5 | 3.0 | | 0.9 | 13.2 | 6.1 | — |
| | 200 | 11.4 | 4.5 | | 1.4 | 13.3 | 9.2 | |
| | 500 | 11.4 | 4.7 | | 1.4 | 13.6 | 9.7 | — |
| +NaOH | 30 | 5.0 | 13.3 | 39.5 | 4.1 | 13.2 | 28.1 | 283 |
| | 60 | 4.7 | 13.2 | | 4.1 | 13.0 | 27.9 | 314 |
| | 90 | 5.1 | 13.5 | | 4.2 | 12.9 | 28.5 | 366 |
| | 299 | 5.3 | 14.3 | | 4.4 | 13.2 | 30.4 | 229 |
| | 500 | 4.9 | 14.4 | | 4.4 | 13.1 | 30.5 | 216 |
| +KOH | 30 | 8.8 | 15.1 | 39.5 | 4.7 | 13.0 | 32.1 | 337 |
| | 60 | 9.4 | 14.7 | | 4.5 | 13.1 | 31.2 | 363 |
| | 90 | 9.3 | 16.0 | | 4.9 | 13.0 | 34.1 | 458 |
| | 200 | 9.2 | 15.7 | | 4.8 | 12.9 | 33.4 | 262 |
| | 500 | 9.2 | 15.6 | | 4.8 | 12.9 | 33.2 | 243 |

TABLE 2-continued

| | Time (min) | Humidity[a] | final % Mg(OH)$_2$ | initial % MgO | e$_1$ (%) | e$_2$ (%) | tC$_{MgO}$ (%) | increase tC$_{MgO}$ (%)[b] |
|---|---|---|---|---|---|---|---|---|
| +LiOH[c] | 30 | 8.5 | 14.8 | 39.5 | 4.6 | 13.6 | 31.7 | 331 |
| | 60 | 8.3 | 15.1 | | 4.7 | 13.2 | 32.2 | 378 |
| | 90 | 8.4 | 15.3 | | 4.7 | 13.3 | 32.7 | 434 |
| | 200 | 8.4 | 15.8 | | 4.9 | 13.1 | 33.7 | 265 |
| | 500 | 8.5 | 15.9 | | 4.9 | 13.4 | 34.1 | 252 |

[a] humidity of product on leaving the mixer after hydration time of 1 h determined by measurement of sample weight loss when dried at 150° C.;
[b] in comparison with product obtained under the same conditions without additive
[c] in fact LiOH•H$_2$O In addition to a significant effect on the conversion rate of MgO to Mg(OH)$_2$ the additives used in this example also had a significant effect on specific surface area and pore volume of the hydrated products as illustrated by the results in Table 3.

TABLE 3

| | Time (min) | Specific surface area[a] | Pore volume[b] |
|---|---|---|---|
| No additive | 500 | 22.4 | 0.105 |
| +NaOH | 500 | 12.9 | 0.067 |
| +KOH | 500 | 8.7 | 0.057 |
| +LiOH[c] | 500 | 13.6 | 0.072 |

[a] BET specific surface area obtained by nitrogen manometry after degassing at 190° for at least 2 h;
[b] volume of pores measuring 17 to 1000 Å such as calculated using the BJH method on the basis of nitrogen adsorption/desorption measurement on degassed sample;
[c] in fact LiOH•H2O.

Example 3

Example 3 below was conducted starting from dolime 5 having a d$_{98}$ of 3 mm or less and containing 39.7% by weight MgO according to analysis by X-ray fluorescence spectrometry.

The dolomite 5 used in this example (excluding impurities such as CaCO$_3$ for example) according to thermogravimetric and X-ray fluorescence analysis contained a weight percentage of MgO of 39.7%, a weight percentage of CaO of 55.1 and had an x/y(mol) ratio i.e. Ca/Mg of 1.00.

This dolomite was initially subjected to the simplified conversion rate determination test at 70° C. as previously described and allowing a description of the reactivity of the materials to be hydrated. The conversion rate of the MgO in this dolomite to Mg(OH)$_2$ throughout this test was 22.6% as illustrated by the results in the Table below and calculated using formula 1.

TABLE 4

| % Mg(OH)$_{2final}$ | % MgO$_{initial}$ | e$_1$ (%) | e$_2$ (%) | tC$_{MgO}$ (%) |
|---|---|---|---|---|
| 10.8 | 39.7 | 3.3 | 13.5 | 22.6 |

Figure 3:
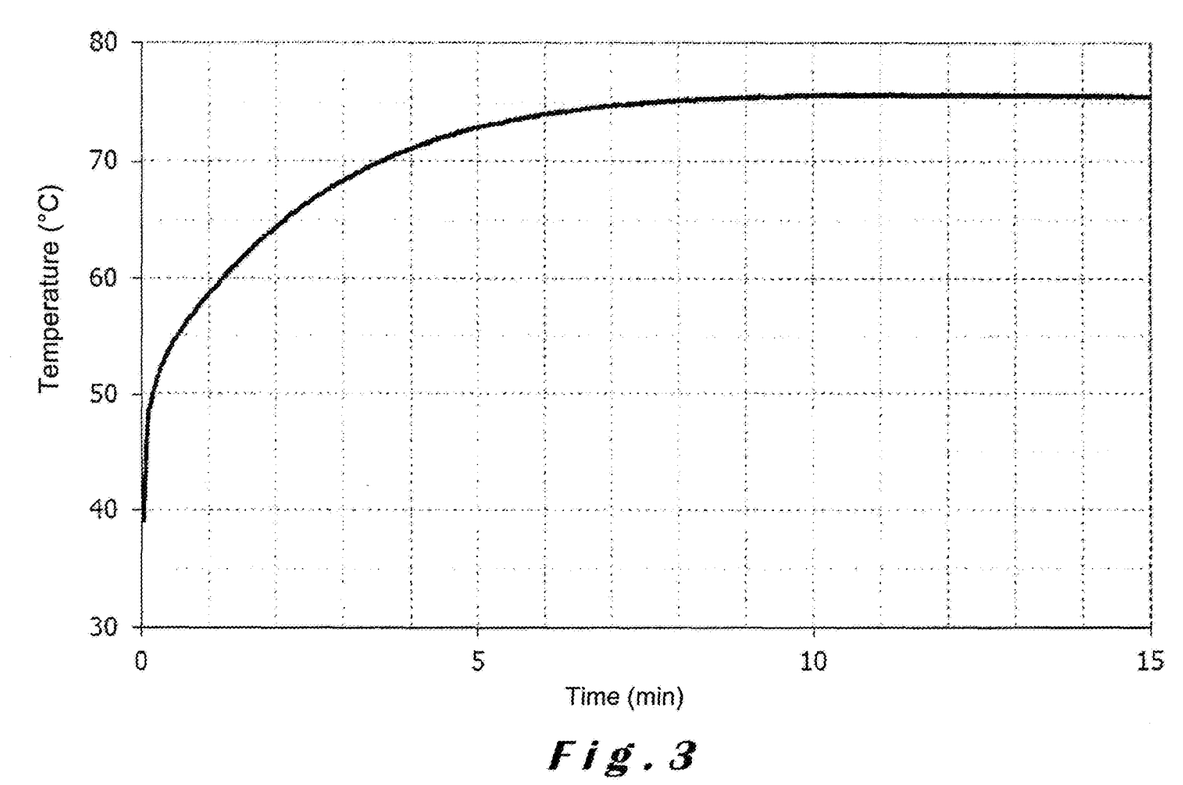
FIG. 3 gives the reactivity curve of the dolimes from Example 3.
Figure 4:
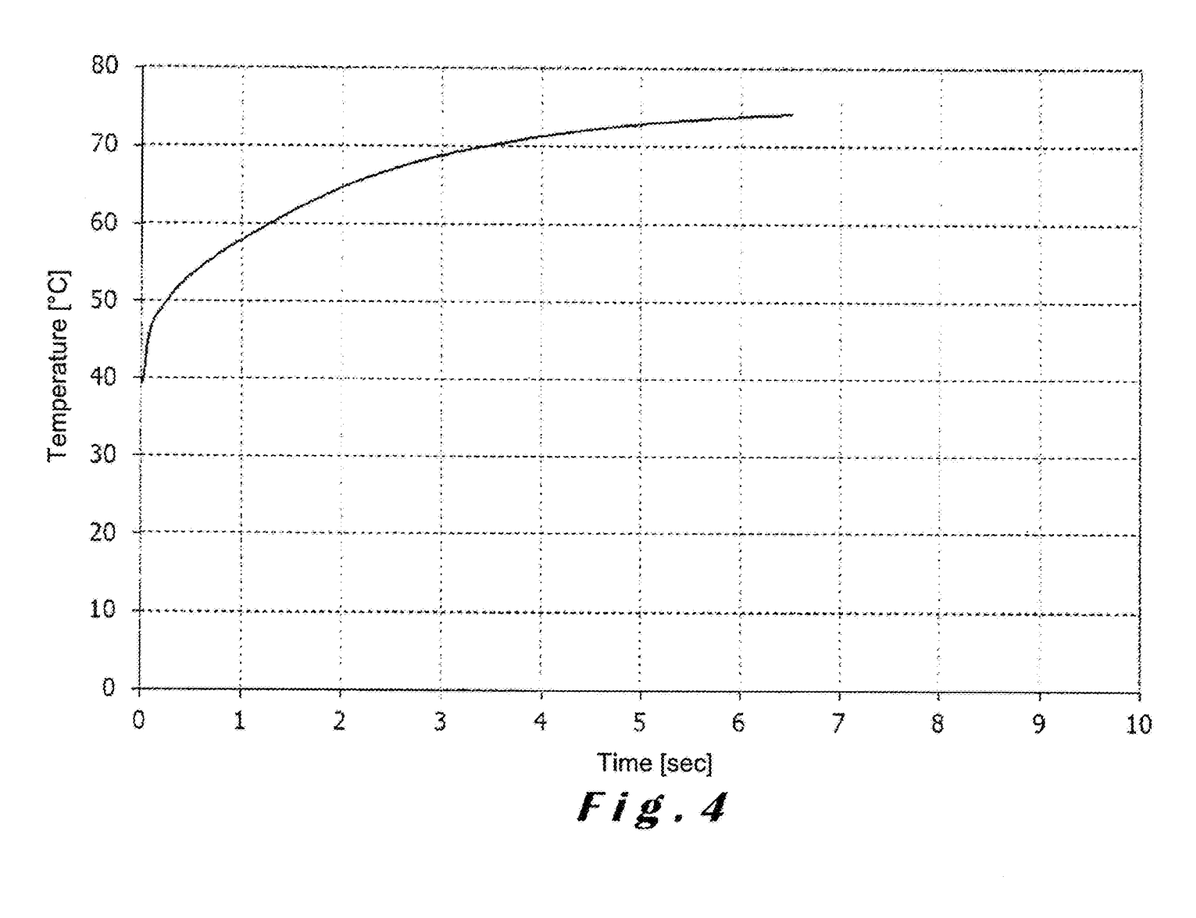
FIG. 4 gives the reactivity curve of the dolime from Example 7.

In addition, the reactivity test such as described in the foregoing and in ASTM C110 indicated relatively high reactivity for this dolomite: the t$_{70}$ was 3.5 minutes and only 1.2 minutes were required to reach 60° C. starting from 40° C. as illustrated by the reactivity curve in FIG. 3.

This dolime was then hydrated in a laboratory pilot hydrator. This hydrator is a single-stage hydrator. It is in the shape of a horizontal cylinder measuring about 80 cm in length with a diameter of 25 cm. These proportions correspond to the proportions of industrial single-stage hydrators conventionally used for the hydration of quicklime or dolime at atmospheric pressure by dry or nearly-dry process. These dimensions are 6 to 7 times smaller than the dimensions of industrial hydrators. This cylinder is equipped with a double jacket allowing temperature control by circulating a hot or cold fluid. Inside the hydrator a shaft fitted with paddles is used to homogenise the product during hydration but also to move the product from the inlet (at one end) towards the outlet (at the other end of the cylinder). When the product has travelled the entire length of the hydrator it leaves the hydrator by simple overflow. In general the filling level of the hydrator is in the order of 50% by volume i.e. the height of the bed of product reaches about the height of the shaft.

The hydrator is pre-heated to 70-80° C. by circulating water at 90° C. inside the double jacket. This pre-heating allows simulation of a steady state that is obtained industrially by continuous operation and prevents condensation of water vapour produced by the hydration reaction of the dolomite on the walls of the hydrator if they are cold. The double jacket is drained when the hydration reaction is initiated in the hydrator.

In this example, the dolomite was placed in the hydrator using a worm-screw that was previously calibrated to adjust the flow rate of dolime at 200 g/min.

The dolomite was hydrated with a water/dolime weight ratio of 0.4 in the presence of 1% sodium aluminate of formula NaAlO$_2$ relative to the weight of dolime. Hydration was performed continuously and the mean residence time of the hydrate in the reactor was in the order of 15-20 min. Overall, the hydration under these conditions lasted 60 minutes. To pay heed to these conditions, a solution was prepared prior to hydration by mixing 5160 g of demineralised water and 120 g of sodium aluminate of formula NaAlO$_2$. This solution was held under continuous agitation. When the operation to add dolime to the hydrator was commenced, the injection of this solution was also initiated. This injection into the hydrator was performed via two orifices each measuring about 5 mm in diameter located on the cover of the hydrator close to the inlet for the dolime, using spray nozzles. The flow rate of this solution was set at 88 g/min.

The first 40 minutes of hydration corresponded to the start-up of the hydrator. Over the following 20 minutes samples were regularly taken and dried in a thermal balance at 150° C. in less than 30 minutes. Their humidity was recorded. These dried samples were then subjected to thermogravimetric measurement allowing calculation of the MgO conversion rate to Mg(OH)$_2$. In this example, since the samples were taken directly at the outlet of the hydrator the reaction time can be considered comparable to the residence time in the hydrator.

The same hydration procedure was also carried out using this same dolime under exactly similar conditions but without additive (200 g dolime per minute and 86 g/min of tap water i.e. a water/dolime ratio of 0.43 as previously). This allowed a comparison between the results obtained with and without sodium aluminate under similar operating conditions. These results are compared in Table 5. The additive allowed a significant increase in the percentage of MgO hydration under the conditions of this example, this percentage being more than doubled in the presence of 1% sodium aluminate relative to the weight of dolomite.

TABLE 5

| | Humidity[a] | final % Mg(OH)$_2$ | initial % MgO | $e_1$ (%) | $e_2$ (%) | $tC_{MgO}$ (%) | increase $tC_{MgO}$ (%) |
|---|---|---|---|---|---|---|---|
| Water/dolomite = 0.4 (g/g) No additive | 4.6 | 3.6 | 39.7 | 1.1 | 13.8 | 7.4 | — |
| Water/dolomite = 0.4 (g/g) 1% NaAlO$_2$ | 5.1 | 7.7 | 39.7 | 2.4 | 13.7 | 16.0 | 115 |

[a]humidity of product on leaving the mixer after hydration time of 1 h, determined by measuring weight loss of the sample on drying at 150° C.

Example 4

This example was very similar to Example 3 in that the same dolime was used and hydrated in the same hydrator. However this time the dolime, again added to the hydrator at the rate of 200 g/min, was hydrated with a water/dolime weight ratio of 0.8. Initially the dolomite was hydrated with demineralised water without the addition of an additive (160 g water/min). The water was then replaced by a solution of sodium aluminate of formula NaAlO$_2$ previously prepared by mixing 9600 g of tap water and 600 g of sodium aluminate NaAlO2. During the 60 minutes of hydration (the first 40 minutes to reach steady state) this solution was injected into the hydrator at a rate of 170 g/min. The results obtained under these new conditions with and without additive are compared in Table 6. In this example as in Example 3 the reaction time can be considered comparable to the residence time in the hydrator since the samples were characterized as soon as they left the hydrator.

The additive allowed a very significant increase in the percentage of MgO hydration under the conditions of this example, this percentage more than tripled in the presence of 5% sodium aluminate relative to the weight of dolomite. The value of 28.5% reached for the conversion rate of MgO in the presence of 5% sodium aluminate is a high conversion rate compared with the conversion rates usually obtained without additive under industrial conditions of dolomite hydration by dry process, these generally being considered as not able to exceed 25%.

TABLE 6

| | Humidity[a] | final % Mg(OH)$_2$ | initial % MgO | $e_1$ (%) | $e_2$ (%) | $tC_{MgO}$ (%) | increase $tC_{MgO}$ (%) |
|---|---|---|---|---|---|---|---|
| Water/dolomite = 0.8 (g/g) No additive | 20.1 | 4.3 | 39.7 | 1.3 | 14.0 | 8.8 | — |
| Water/dolomite = 0.8 (g/g) 5% NaAlO$_2$ | 22.0 | 13.5 | 39.7 | 4.2 | 13.4 | 28.5 | 225 |

[a]humidity of product leaving the mixer after hydration time of 1 h, determined by measuring weight loss of the sample on drying at 150° C.

Example 5

In this example the dolime 2 described in Example 1 was hydrated in the laboratory pilot hydrator already used in Examples 3 and 4 above. This time the dolime flow rate was set at 150 g/min but all the other settings were maintained constant in relation to the protocol described in Example 3 (pre-heating, filling level . . . ).

This dolime was first hydrated with demineralised water previously heated to 70° C. and added to the hydrator at a rate of 55 g/min. This water was then replaced by a sodium hydroxide solution (NaOH) at a concentration of 10% by weight also pre-heated to 70° C. and added at a flow rate of 85 g/min. This corresponds to adding 5.7% NaOH relative to the weight of dolime.

As previously in Example 3, the mean residence time in the hydrator was in the order of 20-30 minutes. As soon as it left the hydrator, the hydrated product was characterized (again the reaction time was equivalent to the residence time). The results are given in Table 7. In this case the effect of the use of the hydroxide during the hydration reaction of the dolime was very strongly marked.

TABLE 7

| | Humidity[a] | Final % Mg(OH)$_2$ | Initial % MgO | $e_1$ (%) | $e_2$ (%) | $tC_{MgO}$ (%) |
|---|---|---|---|---|---|---|
| No additive | 2.0 | <0.5 | 36.8 | 0 | 10.8 | <1 |
| +5.7% NaOH | 2.9 | 21.7 | | 6.7 | 11.3 | 49.7 |

[a]humidity of product leaving the mixer after hydration time of 1 h, determined by measuring weight loss of the sample on drying at 150° C.

The product obtained in the presence of sodium hydroxide and having a conversion rate in the order of 50% showed a BET specific surface area of 11.0 m2/g.

Example 6

This time it was dolime 3 described in Example 1 which was hydrated in the pilot hydrator already used in Examples 3 to 5. It was fed into the hydrator at a rate of 150 g/min.

This dolime was first hydrated with demineralised water previously heated to 70° C. and fed into the hydrator at a rate of 59 g/min. This water was then replaced by a sodium hydroxide solution (NaOH) at a concentration of 7.5 weight %, also pre-heated to 70° C. and fed at a rate of 71 g/min. This corresponds to adding 3.5% NaOH relative to the weight of dolime.

As previously in Example 5, the mean residence time in the hydrator was in the order of 20-30 minutes. On leaving the hydrator the products were placed in a bucket for storage in the laboratory. A first series of samples produced with and without sodium hydroxide was taken directly at the outlet of the hydrator (reaction time=residence time in the hydrator). A second series of samples produced with and without sodium hydroxide was taken from the buckets 1 hour after being removed from the hydrator (reaction time=residence time+1 h). The results are given in Table 8. While the sodium hydroxide already allowed the conversion rate of MgO to $Mg(OH)_2$ to be doubled during the time spent in the hydrator (reaction time=residence time) it had a much stronger effect when the products were stored for 1 hour before being characterized (reaction time=residence time+1 h). In the presence of sodium hydroxide a conversion rate of almost 76% was able to be reached after a storage time of only 1 hour after leaving the hydrator. On the other hand, the product obtained without additive did not react during this hour of storage. The product obtained in the presence of sodium hydroxide and having a conversion rate in the order of 76% had a BET specific surface area of 9.2 m²/g.

less closed thereby leading to release of energy from the hydration reaction and hence to a lower temperature during hydration than the temperature measured for the same dolomite and the same water/dolomite ratio in the more closed ploughshare mixer. However the water and dolomite were added in exactly the same manner as in Examples 1 and 2.

This time 800 g of dolime and 320 g of demineralised water (water/dolomite=0.4) were gradually fed into in the mixer over a time of about 20 minutes. On completion of this feed phase the mixture was left under mixing for a hydration time of 60 minutes. The product was then removed from the mixer, dried at 150° C. and analysed to determine the conversion rate of MgO to $Mg(OH)_2$ under these conditions (reaction time=residence time).

In this example hydration was first performed with water without additive to be used as reference, then with 3% sodium silicate relative to the weight of dolomite. The sodium silicate was used in the form of water glass i.e. in the form of a sodium silicate having a molar ratio $SiO_2/Na_2O$=3.5 in solution in the water at a concentration of 37%.

The results are given in Table 9. They show a low percentage of dolomite 6 hydration without additive compared with the percentages obtained without additives for dolomites 1 to 6 in the preceding examples, probably due to

TABLE 8

| | Reaction time | Humidity[a] | Final % $Mg(OH)_2$ | Initial % MgO | $e_1$ (%) | $e_2$ (%) | $tC_{MgO}$ (%) |
|---|---|---|---|---|---|---|---|
| No additive | Residence time | 1.6 | 1.9 | 37.0 | 0.6 | 13.2 | 4.1 |
| | Residence time + 1 h | 1.2 | 1.8 | | 0.6 | 13.6 | 3.9 |
| +3.5% NaOH | Residence time | 11.0 | 4.2 | | 1.3 | 13.5 | 9.2 |
| | Residence time + 1 h | 1.5 | 31.3 | | 9.7 | 13.1 | 75.7 |

[a] humidity of product leaving the mixer after hydration time of 1 h, determined by measuring weight loss of the sample on drying at 150° C.

Example 7

In this example dolime 6 was considered. This time it was hydrated in a Hobart epicyclic, planetary mixer of 5 dm³ capacity.

Calcined dolomite 6 used in this example (excluding impurities such as $CaCO_3$) according to thermogravimetric and X-ray fluorescence analyses contained a weight percentage of MgO of 40.9%, a weight percentage of CaO of 54.1 and the x/y (mol) ratio i.e. of Ca/Mg was 0.95.

The main difference between this mixer and the ploughshare mixer in Examples 1 and 2 is that this mixer is much the lower hydration temperature as explained above. On the other hand, the hydration with sodium silicate allowed a much higher MgO hydration rate to be obtained under these same conditions.

TABLE 9

| | Humidity[a] | Final % $Mg(OH)_2$ | Initial % MgO | $e_1$ (%) | $e_2$ (%) | $tC_{MgO}$ (%) | increase $tC_{MgO}$ (%) |
|---|---|---|---|---|---|---|---|
| No additive | 2.7 | 1.5 | 40.9 | 0.4 | 13.8 | 2.9 | — |
| +3% Na | 5.0 | 4.8 | | 1.5 | 12.4 | 9.4 | 224 |

Comparative Example 1

This comparative example is similar to Example 2, but this time it was not an alkaline hydroxide which was used as additive for hydration of dolime 1 but hydrochloric acid. As in Example 2, the water/dolomite weight ratio was kept at 0.4 and the amount of additive at 3% relative to the weight of dolomite. For this purpose, following the protocol in Example 2, a solution prepared with 81 g hydrochloric acid at 37 weight % and 349 g of demineralised water was gradually added to 1 kg of dolomite. After a residence time of 30 minutes in the mixer where hydration took place the product was dried and characterized (reaction time=residence time). The results of this test are given in Table 10 and show a negligible effect of hydrochloric acid on the percentage hydration of the MgO portion of this dolomite (FIG. 2).

Comparative Example 2

This second comparative example is exactly similar to comparative Example 1, but this time the hydrochloric acid was replaced by diethylene glycol (DEG) in liquid form (1 kg of dolime+400 g demineralised water previously mixed with 30 g of liquid DEG). The results are given in Table 10 and again indicate a negligible effect of DEG on the MgO conversion rate of this dolomite (FIG. 2).

TABLE 10

|  | Final % $Mg(OH)_2$ | Initial % MgO | $e_1$ (%) | $e_2$ (%) | $tc_{MgO}$ (%) |
|---|---|---|---|---|---|
| No additive | 3.6 | 39.5 | 1.1 | 13.2 | 7.4 |
| 3% HCl | 3.9 |  | 1.2 | 12.9 | 7.9 |
| 3% DEG | 4.0 |  | 1.2 | 11.6 | 8.0 |

The present invention is evidently in no way limited by the embodiments described in the foregoing and numerous modifications can be made thereto without departing from the scope of the appended claims.

The invention claimed is:

1. A method for the dry slaking of calcium and magnesium oxides of a calco-magnesian compound, comprising the steps of:
    feeding a calco-magnesian compound containing MgO into slaking equipment;
    feeding an aqueous slaking phase into the said slaking equipment; and
    slaking the said calcium and magnesium oxides of the said calco-magnesian compound fed into the said slaking equipment, with the said aqueous slaking phase, leading to the formation of slaked solid particles of calcium and magnesium hydroxides,
wherein the said slaking is performed at ambient pressure in the presence of an additive selected from the group consisting of water-soluble metal hydroxides, water-soluble metal silicates, water-soluble aluminates, water-soluble metal halides, water-soluble metal nitrates, water-soluble ammonium salts, ammonia and the mixtures thereof and wherein the slaked solid particles are in the form of solid particles containing less than 30% water by weight, the said calcium and magnesium oxides of calco-magnesian compound having a magnesium oxide content of at least 10 weight % and lower than 50 weight % relative to the weight of the said calco-magnesian compound, and having a calcium/magnesium molar ratio of between 0.8 and 1.2.

2. The slaking method according to claim 1, wherein the said calco-magnesian compound is selected from the group consisting of dolime, or semi-hydrated dolime, combined calco-magnesian compounds, and the mixtures thereof.

3. The slaking method according to claim 1, wherein the said water-soluble metal hydroxides are selected from the group consisting of sodium, potassium or lithium hydroxides, and the mixtures thereof.

4. The slaking method according to claim 1, wherein the said water-soluble metal silicates are selected from the group consisting of sodium and lithium silicates, alkaline-earth silicates and the mixtures thereof.

5. The slaking method according to claim 1, wherein the said water-soluble aluminates are selected from the group consisting of potassium aluminate, sodium aluminate, lithium aluminate, ammonium aluminate and the mixtures thereof.

6. The slaking method according to claim 1, wherein the said water-soluble metal halides are selected from the group formed by metal chlorides, metal bromides, metal fluorides and the mixtures thereof.

7. The slaking method according to claim 1, wherein the said metal nitrates and the said metal halides comprise at least one atom of a metal selected from the group consisting of aluminium, calcium and magnesium.

8. The slaking method according to claim 1, wherein the said metal nitrates and the said metal halides comprise at least one atom of a metal selected from the group consisting of aluminium and magnesium.

9. The slaking method of claim 1, wherein the said additive is added to the said aqueous slaking phase prior to the said feeding of the said aqueous slaking phase to form an additive-containing aqueous slaking phase.

10. The slaking method according to claim 1, wherein the said additive is added to the said aqueous slaking phase inside the said slaking equipment or in the said feed of the said aqueous slaking phase.

11. The slaking method according to claim 1, wherein the said additive is added to the said MgO-containing compound or in the said feed of the said calco-magnesian compound.

12. The slaking method according to claim 1, wherein the said additive is supplied at a content of between 0.1 and 20 weight %, relative to the total weight of MgO.

13. The slaking method according to claim 1, wherein the said calco-magnesian compound has a conversion rate of MgO to $Mg(OH)_2$ of at least 10% as measured by a simplified conversion rate determination test.

14. The slaking method according to claim 1, wherein the said slaking equipment is a dry process hydrator.

15. The slaking method according to claim 1, wherein the MgO conversion rate to $Mg(OH)_2$ is improved by 30% relative to the conversion rate obtained without an additive.

16. The slaking method according to claim 15 wherein the said slaking has a reaction time is less than 5 hours.

17. The slaking method according to claim 1, wherein the said calco-magnesian compound is a powdery compound.

18. The slaking method according to claim 1, wherein the said slaked solid particles have a maximum humidity of 5%.

19. The slaking method according to claim 18 further comprising a step to de-agglomerate or mill the said slaked solid particles.

20. The slaking method according to claim 1, wherein the said aqueous slaking phase has a temperature before slaking lower than 90° C.

* * * * *